US012565148B2

(12) United States Patent
Zhang et al.

(10) Patent No.: US 12,565,148 B2
(45) Date of Patent: Mar. 3, 2026

(54) STRUCTURALLY-REINFORCED VOLUMETRIC BRACKET FOR MOUNTING REARVIEW MIRROR

(71) Applicant: Fuyao Glass America Inc., Moraine, OH (US)

(72) Inventors: Mouzhi Zhang, Northville, MI (US); Chen Cheng, Rochester Hills, MI (US)

(73) Assignee: FUYAO GLASS AMERICA INC., Moraine, OH (US)

( * ) Notice: Subject to any disclaimer, the term of this patent is extended or adjusted under 35 U.S.C. 154(b) by 372 days.

(21) Appl. No.: 18/188,972

(22) Filed: Mar. 23, 2023

(65) Prior Publication Data

US 2024/0317139 A1     Sep. 26, 2024

(51) Int. Cl.
B60R 1/06 (2006.01)
B60R 1/12 (2006.01)
G02B 7/182 (2021.01)

(52) U.S. Cl.
CPC .................. B60R 1/12 (2013.01); B60R 1/06 (2013.01); G02B 7/182 (2013.01)

(58) Field of Classification Search
CPC ..... B60R 1/12; B60R 1/04; B60R 2011/0033; B60R 1/06; B60R 1/24; B60R 2300/806; B60R 2011/0003; G02B 7/182
USPC ........................................ 359/871
See application file for complete search history.

(56) References Cited

U.S. PATENT DOCUMENTS

| | | | |
|---|---|---|---|
| 5,877,897 A | 3/1999 | Schofield |
| 7,837,173 B2 | 11/2010 | Zinser et al. |
| 8,256,821 B2 | 9/2012 | Lawlor et al. |
| 9,352,692 B2 | 5/2016 | Uken et al. |
| 9,487,161 B2 | 11/2016 | Rawlings et al. |
| 10,207,646 B2 | 2/2019 | Oh |

(Continued)

FOREIGN PATENT DOCUMENTS

| | | |
|---|---|---|
| EP | 3057305 A1 | 8/2016 |
| EP | 3495207 A1 | 6/2019 |
| WO | 2007101538 A | 9/2007 |

OTHER PUBLICATIONS

Extended European Search Report for European Patent Application No. 24165713.9; European Patent Office, 80298 Munich, Germany; dated Oct. 24, 2024.

*Primary Examiner* — Daniel St Cyr

(74) *Attorney, Agent, or Firm* — Thomas E. Lees, LLC

(57) ABSTRACT

A structurally-reinforced volumetric bracket for a rearview mirror, a rearview mirror assembly for a vehicular windshield, an electronics assembly for a vehicular windshield and a method of making/using a vehicular rearview mirror assembly. By forming the bracket as an irregular polyhedron-shaped plurality of faceted surfaces, a cantilever-like structure is formed that extends along a height-wise dimension of the bracket relative to a windshield inner surface to have an overhang that is situated over at least a portion of an electronics module housing. In this way, a volumetrically-enhanced structure is formed that can accommodate existing or new electronic components without taking up additional windshield surface area or sacrificing structural rigidity. In this way, the rearview mirror that is secured to the bracket does not suffer from increases in vibratory or other load-based response that otherwise arise out of operating a vehicle during normal use.

21 Claims, 4 Drawing Sheets

(56)                    References Cited

U.S. PATENT DOCUMENTS

| 10,640,046  | B1 * | 5/2020  | Englander ................ B60R 1/04 |
| 12,131,511  | B2 * | 10/2024 | Rother ................... H04N 23/58 |
| 2015/0251605 | A1   | 9/2015  | Uken |
| 2017/0120824 | A1 * | 5/2017  | Hallack ..................... B60R 1/04 |
| 2024/0190343 | A1 * | 6/2024  | Lundy ....................... B60R 1/04 |
| 2024/0246483 | A1 * | 7/2024  | Lintz ........................ B60Q 9/00 |

* cited by examiner

STRUCTURALLY-REINFORCED VOLUMETRIC BRACKET FOR MOUNTING REARVIEW MIRROR

The present specification relates generally to a bracket for a rearview mirror, and more particularly to a bracket that provides an enlarged volumetric cavity with which to allow for a greater amount of vehicular electronic equipment to be placed within a rearview mirror assembly without encroaching on restricted field of view zones of the windshield while also providing enhanced structural rigidity.

BACKGROUND

Traditionally, vehicular rearview mirrors were adhesively secured directly to the interior surface of a windshield. More recently, additional components have been placed in or around the rearview mirror, necessitating larger mounting assemblies with which to adhere or contain one or more of the mirror and such components. Simultaneously, automotive safety regulations place strict limits on how much rearview mirrors and their associated larger structures are permitted to encroach on a driver's outward field of view, thereby making the packaging of such additional components within the volumetric space in and around the rearview mirror much more difficult. Furthermore, attempts to enlarge such structures—particularly those that provide structural support to the rearview mirror—causes structural compliance that in turn leads to unacceptable levels of vibration and other movement being imparted to the rearview mirror.

SUMMARY

The various aspects disclosed herein provide ways to increase the volumetric space in and around rearview mirrors and their associated mounting assemblies.

As such, and according to an aspect of the present disclosure, structurally-reinforced volumetric bracket for a vehicular rearview mirror is disclosed. The structurally-reinforced volumetric bracket includes a main body portion that defines a height-wise dimension that extends from a distal end to a proximal end, the main body portion defining an irregular polyhedron-shaped plurality of faceted surfaces arranged cooperatively with one another to form a rigid structural housing. A windshield-engaging portion is situated at the proximal end of the main body portion, while a mirror-engaging portion is situated at the distal end of the main body portion. The main body portion forms connectivity between the windshield-engaging portion and the mirror-engaging portion. In this way, upon attachment of the structurally-reinforced volumetric bracket to an inner surface of a windshield or another component that is in turn secured to the windshield, a linear distance from the mirror-engaging portion to the windshield-engaging portion along the height-wise dimension is orthogonal to a substantial plane that is formed by the windshield inner surface to define an exaggerated cantilever-like overhanging projection toward the windshield inner surface. This overhanging projection in turn provides a structurally-enhanced volumetric space along the height-wise dimension.

According to another aspect of the present disclosure, a rearview mirror assembly for a vehicular windshield is disclosed. The rearview mirror assembly includes a mirror, a support connected to the mirror to provide pivoting movement thereto, and a structurally-reinforced volumetric bracket that includes a main body portion that defines a height-wise dimension that extends from a distal end to a proximal end, the main body portion defining an irregular polyhedron-shaped plurality of faceted surfaces arranged cooperatively with one another to form a rigid structural housing. A windshield-engaging portion is situated at the proximal end of the main body portion, while a mirror-engaging portion is situated at the distal end of the main body portion. The main body portion forms connectivity between the windshield-engaging portion and the mirror-engaging portion. In this way, upon attachment of the structurally-reinforced volumetric bracket to an inner surface of a windshield or another component that is in turn secured to the windshield, a linear distance from the mirror-engaging portion to the windshield-engaging portion along the height-wise dimension is orthogonal to a substantial plane that is formed by the windshield inner surface to define an exaggerated cantilever-like overhanging projection toward the windshield inner surface. This overhanging projection in turn provides a structurally-enhanced volumetric space along the height-wise dimension.

According to still another aspect of the present disclosure, an electronics assembly for a vehicular windshield is disclosed. The electronics assembly includes numerous electronic components, an electronics module housing defining a plurality of sites formed therein for the placement of the electronic components and a structurally-reinforced volumetric bracket. The electronics module housing includes a base and a cover secured to one another; in this way, at least a portion of the base defines a windshield-engaging adhesive surface such that when the electronics module housing is secured to an inner surface of the vehicular windshield, it provides a generally forward field of view through the vehicular windshield for at least one of the electronic components. The structurally-reinforced volumetric bracket includes a main body portion that defines a height-wise dimension that extends from a distal end to a proximal end, the main body portion defining an irregular polyhedron-shaped plurality of faceted surfaces arranged cooperatively with one another to form a rigid structural housing. A windshield-engaging portion is situated at the proximal end of the main body portion, while a mirror-engaging portion is situated at the distal end of the main body portion. The main body portion forms connectivity between the windshield-engaging portion and the mirror-engaging portion. In this way, upon attachment of the structurally-reinforced volumetric bracket to either an inner surface of a windshield or to the electronics module housing, a linear distance from the mirror-engaging portion to the windshield-engaging portion along the height-wise dimension is orthogonal to a substantial plane that is formed by the windshield inner surface to define an exaggerated cantilever-like overhanging projection toward the windshield inner surface. This overhanging projection in turn provides a structurally-enhanced volumetric space along the height-wise dimension.

According to yet another aspect of the present disclosure, a method of making a vehicular rearview mirror assembly is disclosed. The method includes forming a structurally-reinforced volumetric bracket to include a main body portion, a windshield-engaging portion and a mirror-engaging portion, wherein the main body portion defines an irregular polyhedron-shaped plurality of faceted surfaces arranged cooperatively with one another to form a rigid structural housing. In addition, the structurally-reinforced volumetric bracket is secured to a mirror through a support connected between them where the cooperation of the structurally-reinforced volumetric bracket, support and mirror provides the mirror with pivoting movement. Furthermore, the structurally-reinforced volumetric bracket, support and mirror are placed into cooperation with an electronics module housing that when secured to an inner surface of a vehicular windshield provides a generally forward field of view through the windshield for one or more electronic components that are contained within the electronics module housing. The structurally-reinforced volumetric bracket defines a height-wise dimension that extends from a distal end to a proximal end such that the main body portion forms connectivity between the windshield-engaging portion and the mirror-engaging portion to define a linear distance from the mirror-engaging portion to the windshield-engaging portion along the height-wise dimension that is orthogonal to a substantial plane that is formed by the inner surface to define an exaggerated cantilever-like overhanging projection toward the inner surface of the windshield. In this way, the overhanging projection provides a structurally-enhanced volumetric space along the height-wise dimension that is situated over at least a portion of the electronics module housing along the height-wise dimension.

BRIEF DESCRIPTION OF THE SEVERAL
VIEWS OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

Figure 1:
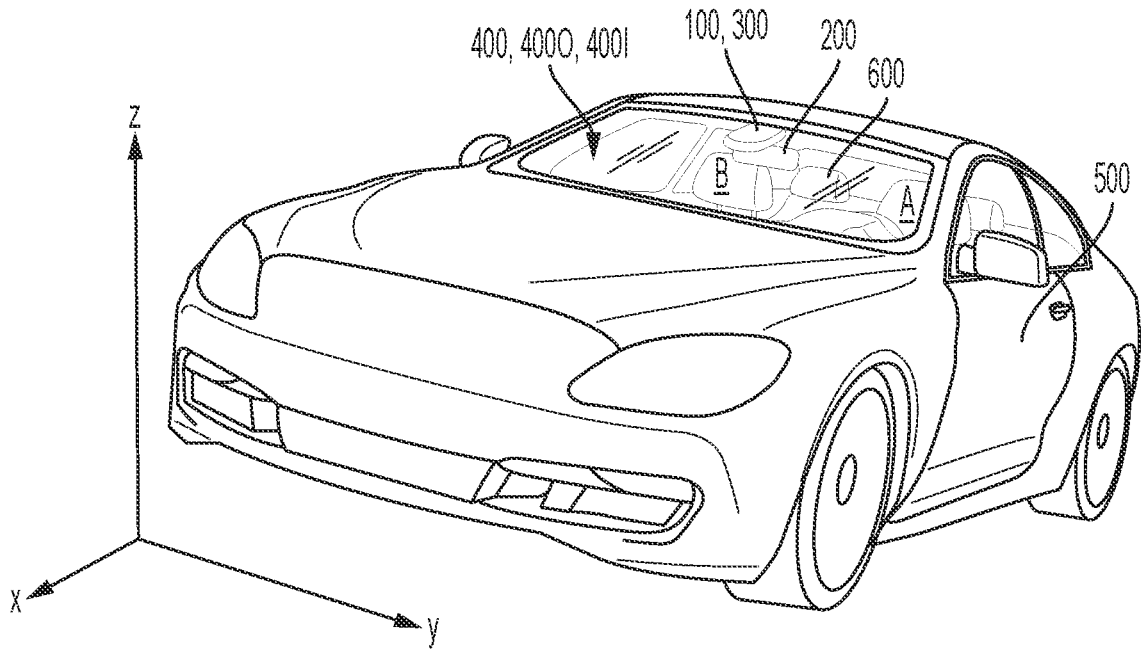
FIG. 1 is a front view of a vehicle that is equipped with a structurally-reinforced volumetric bracket that is placed on an inner surface of the vehicle's windshield along with a vehicular rearview mirror and electronics housing according to one or more aspects of the present disclosure.
Figure 7:
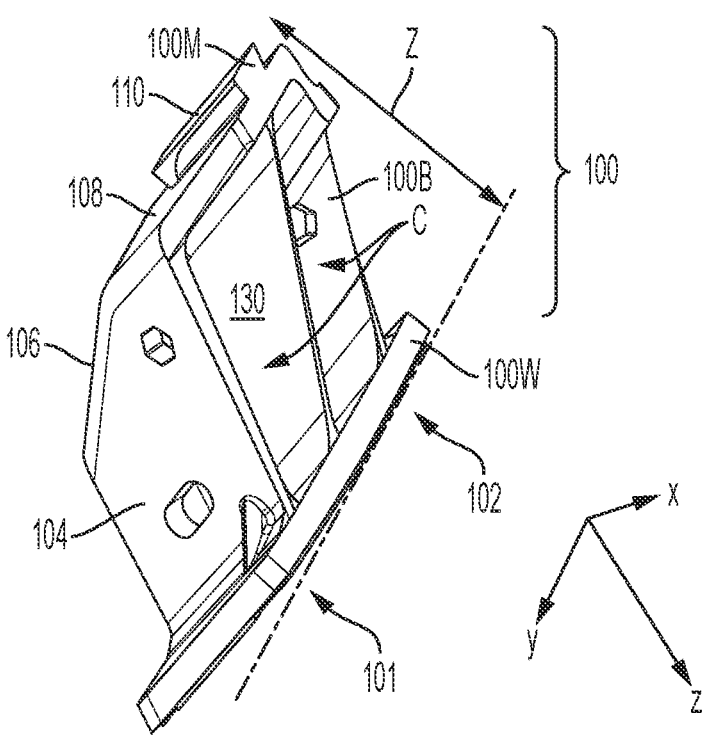
Figure 8:
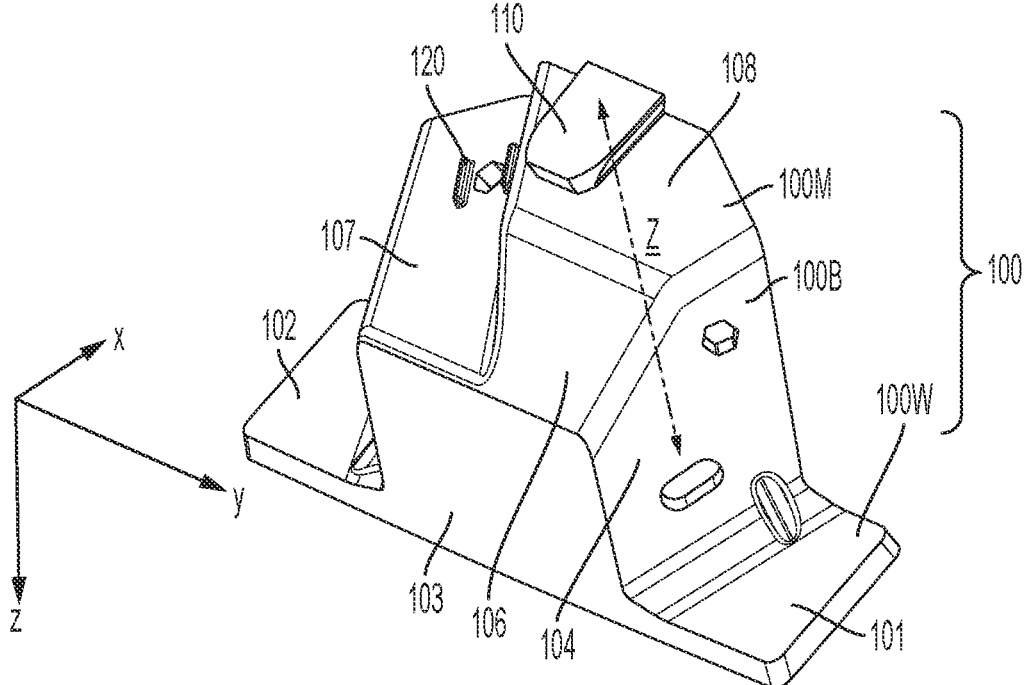

FIG. 7 is a forward-looking perspective view of the structurally-reinforced volumetric bracket of FIG. 1 in isolation showing a linear distance projection from a windshield-engaging portion to a mirror-engaging portion along a direction that is orthogonal to the windshield-engaging portion and the windshield to provide an overhanging, cantilevered structure with enhanced volumetric space; and FIG. 8 is a rearward-looking perspective view of the structurally-reinforced volumetric bracket of FIG. 7 in isolation.

DETAILED DESCRIPTION

The various aspects of the present disclosure address a technical problem identified by the authors of the present disclosure relating to how to simultaneously provide a larger volumetric space in or around the rearview mirror with which to accommodate increasingly larger or more numerous electronic components while maintaining compliance with existing driver visibility regulations and providing enough structural functionality to ensure limited mirror flexural or vibratory movement. The technical solutions disclosed herein bring about several technical effects, including the formation of visually unobtrusive assemblies that provide an increased capacity for a rearview mirror assembly to incorporate electronics-based information-gathering components that can be used for enhanced situational awareness, creature comfort and other vehicle system operability while exhibiting greater resistance to rearview mirror deflection and associated optical aberration.

Referring first to FIG. 1, a structurally-reinforced volumetric bracket 100 according to an aspect of the present disclosure is shown mounted to a rearview mirror 200 mounted and situated adjacent an electronics module housing 300 that along with the structurally-reinforced volumetric bracket 100 is secured to a windshield 400 of a vehicle 500 that has an interior cabin or passenger compartment 600. Within the present disclosure, the terms "rigid", "rigidity" and enhancements thereto, when applied to the structurally-reinforced volumetric bracket 100, are meant to cover those embodiments of the bracket 100 that exhibit enhanced rigidity relative to that which is attained by its constituent material properties alone (although material choice may further such rigidity). By way of example, the choice of certain geometric shapes such as the facets disclosed herein and their arrangement in a manner configured to provide enhanced resistance to loads, vibrations or the like would be considered to form a rigid structural housing for the structurally-reinforced volumetric bracket 100. In another form, the rigidity of the structurally-reinforced volumetric bracket 100 and the various facets and their arrangement are considered to be rigid when the resulting configuration is one that has additional flexural or vibration resistance and that has been shaped into a form that is dictated primarily or entirely by design criteria other than manufacturability, formability, fabricability or related considerations. This in turn imparts more specificity to the term than that afforded its conventional dictionary definition. Within the present disclosure, the term "windshield" 400 and its variants generally refer to an optically transparent laminated glass assembly that is configured for placement within the forward-looking portion of the vehicle 500 such that an operator (for example, a driver) or passenger is able to see out of the front of the passenger compartment 600 through the windshield 400 along the forward travel path of the vehicle 500. Likewise within the present disclosure, the term "vehicle" 500 and its variants (such as "vehicular" or the like) is meant to encompass all forms of transportation where people or goods are propelled from one location to another, including cars, trucks, motorcycles, buses, vans, sport utility vehicles (SUVs), crossovers, trains, aircraft and watercraft, work vehicles, industrial vehicles, offroad vehicles and spacecraft. Moreover, in situations where such vehicle 500 is recited or otherwise referred to with more particularity, such particularity will be apparent from the context. All such forms of windshields 400, vehicles 500 and their passenger compartments 600 (whether enclosed or opened) as disclosed herein are deemed to be within the scope of the present disclosure.

As can be seen, the windshield 400 includes numerous zones, depending on their location. For example, a Zone A that generally corresponds to an outward viewing directly in front of the driver that extends laterally (that is to say, along a generally horizontal direction) roughly the width of the steering wheel and vertically from the bottom to top edges of the windshield 400, along with a Zone B that generally covers (in addition to Zone A) the remainder of the windshield 400 that is swept by the windshield wipers (not shown) of vehicle 500. By numerous vehicular safety regulations throughout the world, the structurally-reinforced volumetric bracket 100, mirror 200 and electronics module housing 300 (as well as any associated components or features) are prohibited from obstructing the driver's field of view in these zones. As such, in one form, the mirror 200 and electronics module housing 300 are adhesively placed on an upper central area of the cabin-facing inner surface 400I of the windshield 400.

In one form, the windshield 400 includes an outer surface 400O and an inner surface 400I, and is typically constructed in a laminated fashion. By way of example, the inner and outer surfaces 400I, 400O may be made from soda lime glass, aluminosilicate glass, borosilicate glass, polymethyl methacrylate (PMMA), polycarbonate (PC) or the like. An intermediate layer (not shown) may be placed between the inner and outer surfaces 400I, 400O and be made of an organic polymer film material such as polyvinyl butyral (PVB), a semi-crystalline ionomer-based material (such as SentryGlas® ionoplast or an equivalent), ethylene vinyl acetate (EVA), polyurethane film (PU) or the like. While the intermediate layer provides some measure of structural integrity, its main purpose is to limit shattering of the windshield 400 upon an impact. In one form, the outer glass surface 400O, intermediate layer and inner surface 400I are permanently bonded together such that a laminated glass assembly that makes up the windshield 400 achieves at least one of sound insulation, heat insulation, infrared protection, or ultraviolet protection. By way of example, the windshield 400 may be made to exhibit ultra-thin properties details of which may be found in US Published Application 2023/0009931 entitled ULTRA-THIN LAMINATED GLASS ASSEMBLY WITH ELECTRIC CIRCUITRY that corresponds to pending U.S. patent application Ser. No. 17/698,027 that was filed on-Mar. 18, 2022, is owned by the Assignee of the present disclosure and the entirety of which is incorporated herein by reference. In another form, the windshield 400 may include one or more features that are used to achieve certain levels of light transmittance, weight reduction, impact resistance or the like. Examples of such glass include borosilicate glass, low-iron glass, ultra-clear glass or glass that has been treated with coatings, films or the like and glass that allows as much of the signals being sensed by the various electronic components that are situated in the electronics module housing 300. It will be appreciated that all such forms of windshield 400 are within the scope of the present disclosure.

Regardless of the thickness or other attributes of the windshield 400, it will be appreciated that while in one form it defines a generally curvilinear shape over its height and width dimensions, locally (that is, at the location where one or more of the structurally-reinforced volumetric bracket 100, mirror 200 and electronics module housing 300 are mounted or otherwise secured thereto) may be thought of as being substantially planar. In that way, minute surface curvature or related contouring at places where the inner surface 400I and these various components (some of which may be seen at a windshield-engaging portion 100W at a proximal end 100P, as will be discussed in conjunction with FIG. 2) are adhesively or otherwise coupled to one another will be understood to be compatible with a generally orthogonal z-axis projection that extends therefrom and into the passenger compartment 600 without any appreciable loss in accuracy or specificity.

Figure 2:
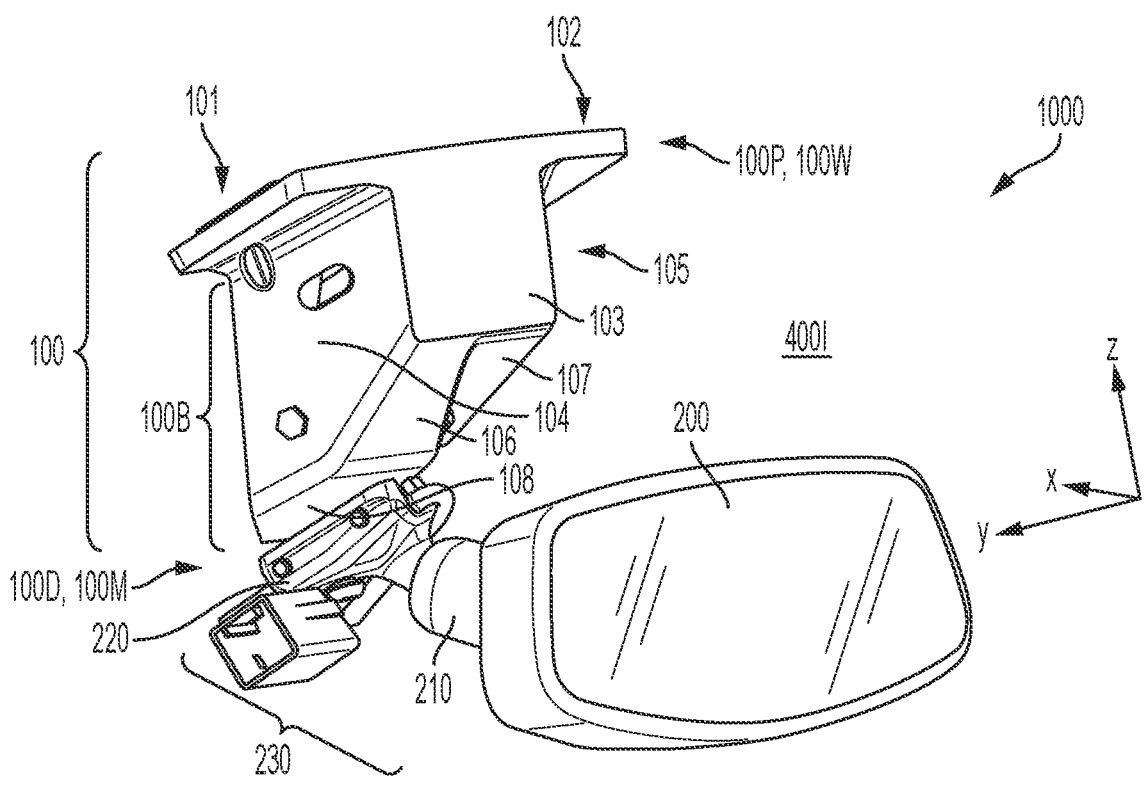
FIG. 2 is an aft-perspective view of the structurally-reinforced volumetric bracket of FIG. 1 and the vehicular rearview mirror placed on an inner surface of the vehicular windshield and where the electronics housing has been removed for clarity.

Referring next to FIG. 2, a rearview mirror assembly 1000 for the windshield 400 is shown. The assembly 1000 includes the structurally-reinforced volumetric bracket 100 and the rearview mirror 200. In one form, the mirror 200 is a passive (that is to say) conventional rearview mirror with an optically reflective surface, while in another it may be configured as an active device such that it serves as a display based on a feed from one or more vehicle-mounted from a cameras (not shown).

The structurally-reinforced volumetric bracket 100 is made up of a main body portion 100B, the aforementioned windshield-engaging portion 100W at the proximal end 100P that is placed adjacent the inner surface 400I of the windshield 400 and a mirror-engaging portion 100M at a distal end 100D that projects inward into the passenger compartment 600. A height-wise dimension associated with the structurally-reinforced volumetric bracket 100 extends linearly (that is to say, in a straight line in Euclidean space) along the z-axis in Cartesian space from the distal end 100D to the proximal end 100P. To mount or otherwise secure the structurally-reinforced volumetric bracket 100 to the inner surface 400I of the windshield 400, an adhesive may be placed on an uppermost surface that corresponds to two opposing wings 101 and 102 of the windshield-engaging portion 100W. The mirror-engaging portion 100M is shown in the form of a tab (also referred to as a mirror button) 110 that is situated underneath a facet 108 that coincides with the lowermost portion of the structurally-reinforced volumetric bracket 100 at its distal end 100D when the structurally-reinforced volumetric bracket 100 is secured to the windshield 400 that in turn is secured to the vehicle 500. More particularly, the facet 108 provides connectivity and support for the tab 110. It will be appreciated within the present context that alternatively the mirror-engaging portion 100M may include one or both of the tab 110 and the facet 108, depending on the degree of contact with one or both with the mirror 200, either directly or through a support 210, and that the understanding of which will be apparent from the context. As shown, the tab 110 is shaped (such as through an angled or otherwise tapered construction) to engage a complementary surface (not shown) of the support 210 that forms a pivoting connection to the mirror 200, either directly or through a structural intermediary 220. It will be appreciated that the equipment that provides the connectivity between the rearview mirror 200 and the mirror-engaging portion 100M may be thought of as discrete individual components (such as the support 210 and other structural intermediaries 220), or as part of a unified assembly 230 that functions as a single device (including in one form as being an integral part of the mirror 200), and that all variants and their construction are deemed to be within the scope of the present disclosure.

With particular regard to the structurally-reinforced volumetric bracket 100, at least some of its enhanced structural rigidity (that is, resistance to deflections under vibratory, static or other loads) is achieved by its angular, faceted structure that makes up a main body portion 100B of the structurally-reinforced volumetric bracket 100. As can be seen, numerous facets (or faces) 103, 104, 105, 106, 107, 108 and 109 are interconnected in angled fashion to impart an irregular major surface pattern of the main body portion 100B that resembles a convex non-uniform polyhedron. The various facets 103, 104, 105, 106, 107, 108 and 109, along with their accompanying edges and vertices provide significant increases in moments of inertia to the structurally-reinforced volumetric bracket 100 that in turn provides enhanced rigidity that results in greater resistance to deflection. Within the present context, the wings 101, 102 (at the proximal end 100P) and the mirror-engaging portion 100M that is made up of one or both of the facet 108 and tab 110 (at the distal end 100D) may also be considered to form facets in the manner of the facets 103, 104, 105, 106, 107, 108 and 109 of the main body portion 100B, particularly in situations where their presence contributes significantly to the overall deflection resistance of the structurally-reinforced volumetric bracket 100, as well as configurations where the structurally-reinforced volumetric bracket 100 is formed as a unitary structure, such as by casting or the like. At least in this latter form, the integral construction of the wings 101, 102 of the windshield-engaging portion 100W, the tab 110 of the mirror-engaging portion 100M and the remainder of the facets 103, 104, 105, 106, 107, 108 and 109 of the main body portion 100B form a single, continuous, unitary whole. It will be apparent from the context whether one or more of the wings 101, 102 and the tab 110 are meant to be included with the remainder of the facets 103, 104, 105, 106, 107, 108 and 109. For example, in one form the tab 110 is a discrete structure that is pivotally mounted onto the facet 108 such that it may swivel about one or more of the x-, y- and z-axes to allow for driver adjustment of the rearview mirror 200. By way of example, the range of movement about the z-axis could be about 180°.

Figure 3:
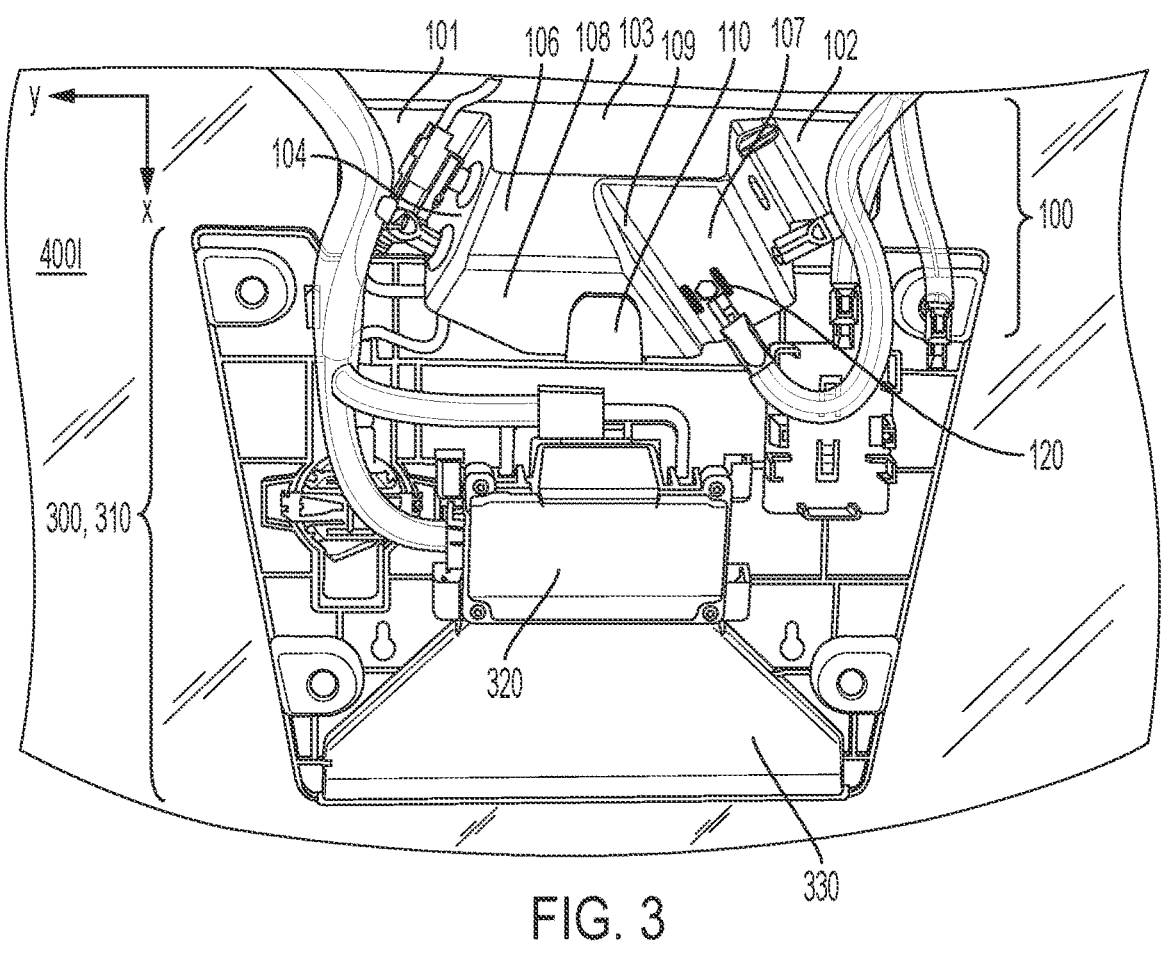
FIG. 3 is an upwardly- and outwardly-looking view through the windshield that depicts the placement of the structurally-reinforced volumetric bracket of FIG. 1 relative to the electronics housing where a cover of the electronics housing has been removed for clarity.

Referring next to FIG. 3, an electronics module assembly 2000 for the windshield 400 is shown. The assembly 2000 includes the structurally-reinforced volumetric bracket 100, the rearview mirror 200 and the electronics module housing 300. In one form, the electronics module housing 300 includes a base 310 and a cover (or fairing, not shown) that are secured to one another such as through snap-fit connection, one or more fasteners, hinged connection or even placed adjacent one another such that that cover provides some measure of aesthetic (that is to say, visual) or environmental isolation of the base 310 and the various electronic components (such as cameras 320, lidar 330 or the like) contained therein. For example, the cover of the electronics module housing 300 may conceal the various electronic components from view within the passenger cabin, as well as keep dust, excessive light or other contaminants from getting into the volumetric space that is defined by the base 310 and cover. As shown, the base 310 may provide secure mounting locations and support for the cameras 320, lidar 330 or other components or devices, including a rain sensor, a radar unit, a temperature sensor, other sensors, a telephone communications module, a display or the like, as well as their voltage supplies (none of which are shown). As with the cover, the base 310 provides visual isolation and environmental isolation, including that which exists on the outside of the windshield 400. In one form, the electronics module housing 300 (including one or more of the base 310 and cover) is made from a moldable material, such as an injection molded plastic resin. Examples of such material may include polybutylene terephthalate (PBT), polyamides (PA) and glass-filed variants, polycarbonate (PC) or some combination such as PBT with glass filling or PC plus acrylonitrile butadiene styrene (ABS). In addition to providing a mounting location for the various electronic components, the electronics module housing 300 may be used to shield sensitive electronic components from environmental effects. As is understood, such components may be used to gather information related to enhanced situational awareness, creature comforts, vehicular safety equipment or the like, including temperature and related environmental control of the passenger compartment 600, the communication of information to the driver or passengers, hands-free communications equipment, infotainment or the like.

The structurally-reinforced volumetric bracket 100 may be fabricated (such as through die casting or the like) using lightweight materials with a relatively high modulus of elasticity. In one form, the material is metal-based, such as an aluminum alloy, while in another a zinc alloy. In another form, high-performance plastics (that is, those with high, thermal, chemical and mechanical stability properties, including for the latter high flexural modulus or modulus of elasticity, rigidity and resistance to fatigue) may be used. One example of a suitable polymer-based material for the structurally-reinforced volumetric bracket 100 is ABS, although it will be appreciated that others that exhibit one or more of high flexural modulus, high strength and high thermal stability (examples of which may include polyetheretherketone (PEEK), acetal (polyoxymethylene), polyphenylene sulfide (PPS) and polyetherimide (PEI)) are also within the scope of the present disclosure. Regardless of whether made from one of the aforementioned specialty materials or their structural equivalents, by combining these high-rigidity materials along with casting-based methods of component fabrication, additional features may also be designed-in, such as one or more apertures to allow for the passage of wires, cables or other electrical equipment, as well as a pair of upstanding rails 120 to provide additional mounting support for terminal connectors or the like. It will be appreciated that other surface features may be designed-in as well in order to provide for additional rigidity, component mount points or the like, and that all variants are deemed to be within the scope of the present disclosure.

Figure 4:
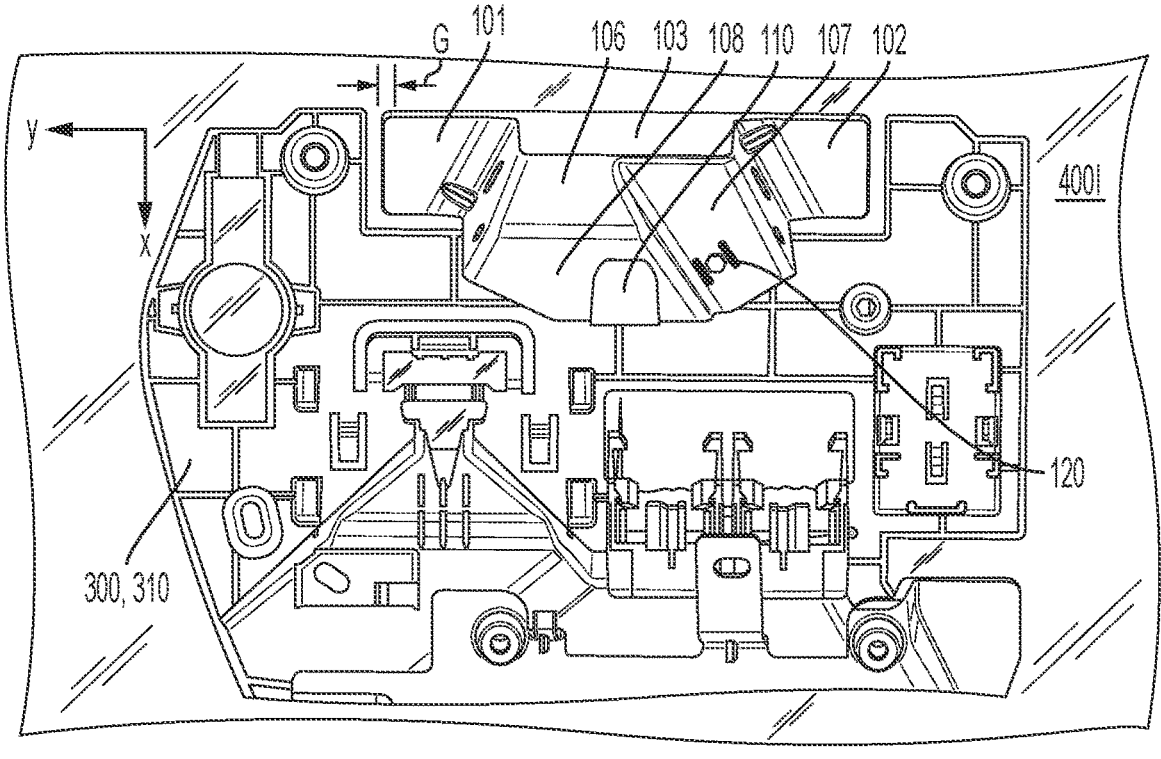
FIG. 4 is an upwardly- and outwardly-looking view through the windshield that depicts the placement of the structurally-reinforced volumetric bracket of FIG. 1 that is physically decoupled from a different electronics housing where a cover of the electronics housing has been removed for clarity.
Figure 5:
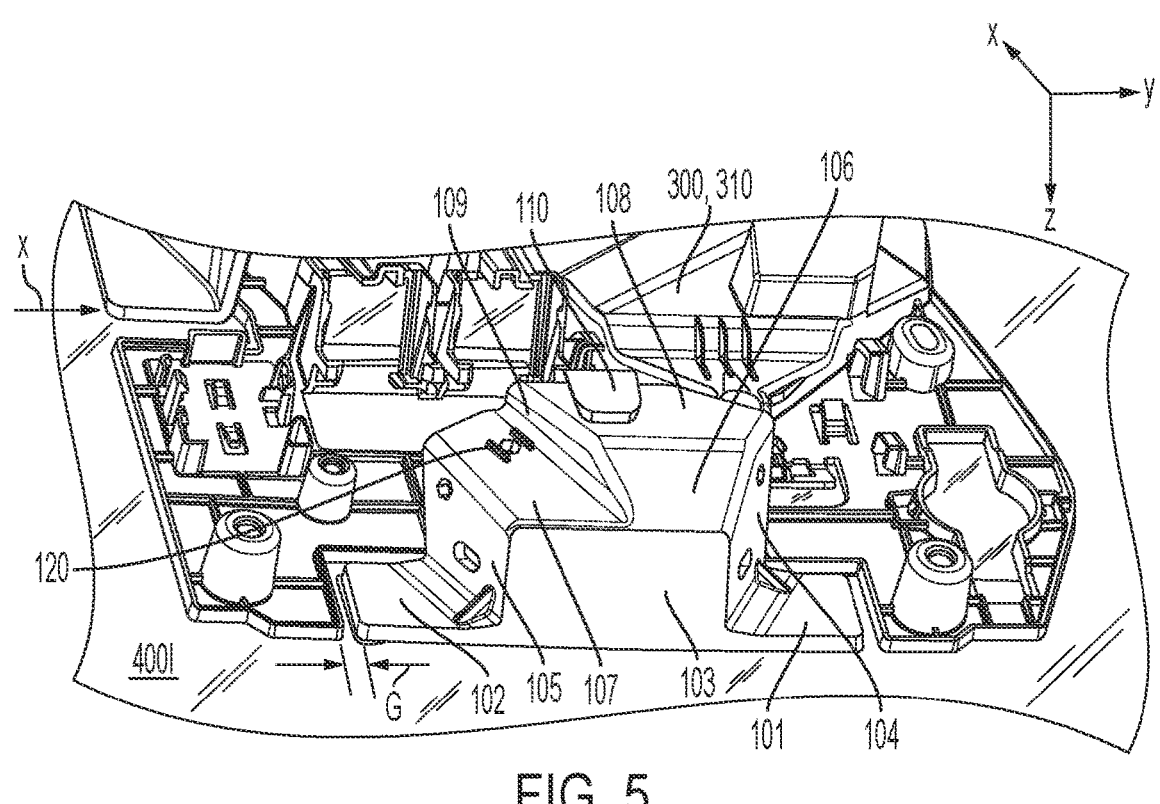
FIG. 5 is a substantially forward-looking-aft view of the structurally-reinforced volumetric bracket and electronics housing of FIG. 4.
Figure 6:
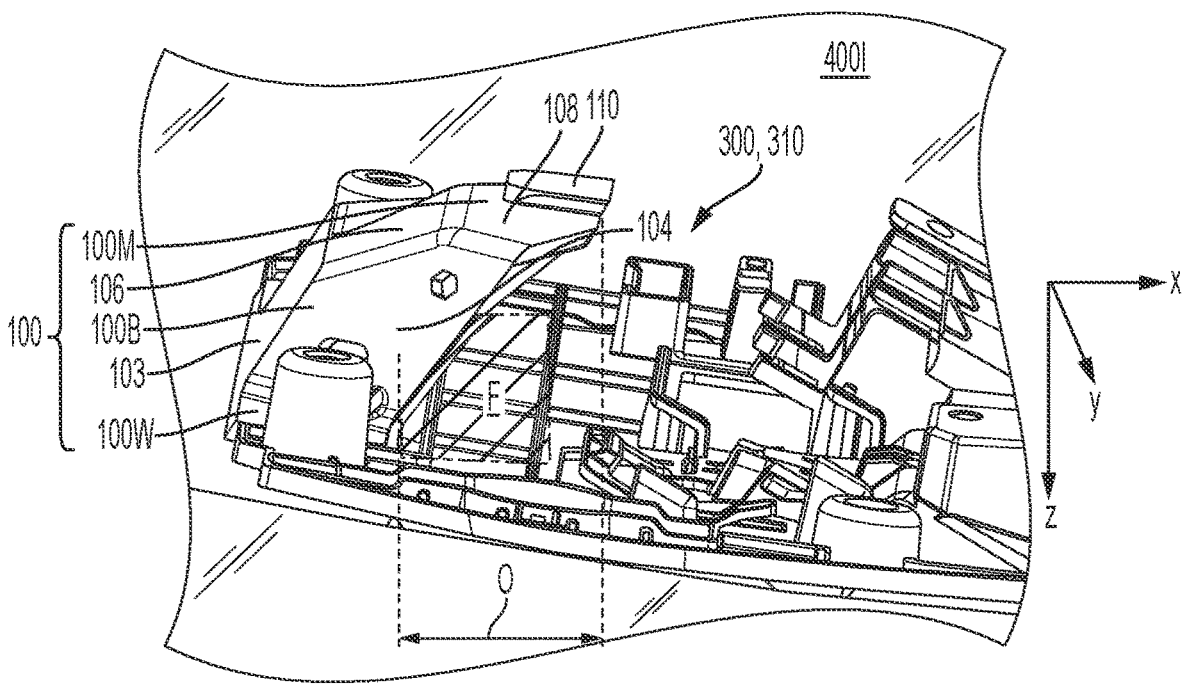
FIG. 6 is a side view of the structurally-reinforced volumetric bracket and electronics housing of FIG. 4 that highlights an increased volumetric space for the protection or mounting of electronic components that is made possible by the overhanging, cantilevered nature of the structurally-reinforced volumetric bracket.

Referring next to FIGS. 4 through 6, various views showing an embodiment of the structurally-reinforced volumetric bracket 100 that is structurally decoupled from the adjacent electronics module housing 300. As seen with particularity in FIGS. 4 and 5, the structurally-reinforced volumetric bracket 100 is configured to insert into a cutout formed in the base 310. Mechanical decoupling is evidenced by gap G. In another form (not shown), the structurally-reinforced volumetric bracket 100 may instead be secured to the electronics module housing 300, such as by mounting somewhere on a major surface thereof.

As seen with particularity in FIG. 6, at least some of the increase in volumetric capacity of the structurally-reinforced volumetric bracket 100 is attributed to its overhang O that is defined by the amount that the forwardmost portion of one or both of the facet 108 and the tab 110 at the distal end 100D projects along the x-axis relative to the forwardmost portion of the base (as embodied by the wings 101, 102 as shown) at the distal end 100D. In this way, the structurally-reinforced volumetric bracket 100 exhibits a dual-axis cantilevered structure in that the cantilever extends along both its x-axis and z-axis that in turn creates an exaggerated cantilever-like overhanging projection with a free end that terminates at the distal end 100D of the main body portion 100B to provide a mounting (or support) location for the mirror 200. In addition, this overhang O (which in one form analogizes the porch cover of a house or related building) provides additional space with which additional electronic components or other equipment (not shown) may be stacked along the z-axis while allowing the size of a so-called windshield-engaging footprint F that is formed by the electronics module housing 300 to remain as-is (that is to say, not increase along the x-axis and y-axis). In this way, the overhang O is situated over at least a portion of the base 310 of the electronics module housing 300 along the height-wise dimension such that it projects onto the base 310 an area corresponding to the footprint F in a way that allows the facets 103, 104, 105, 106, 107, 108 and 109 to provide a structurally-enhanced volumetric space along the height-wise dimension that—along with the footprint F that defines a floor-like portion formed by the base 310—can accommodate existing or new components without requiring the windshield-engaging surface area of the electronics module housing 300 to increase. Thus, for visualization purposes, if a light source (whether natural sunlight or artificial) were to originate from a location that extends farther along the z-axis than the distal end 100D of the structurally-reinforced volumetric bracket 100 and shine its light thereon, such light would cast a shadow with an area of projection that would define the footprint F that in turn would coincide with the amount of overhang O that is caused by the relative forwardmost projection of the distal end 100D beyond the proximal end 100P. A volumetric space that can be thought of as a height-wise extension of the of the two-dimensional projected area (that is to say, the footprint F) formed by the shadow is thereby created without requiring the use of an enlargement of such projected area in, on or around the electronics module housing 300. Thus, when the structurally-reinforced volumetric bracket 100 is placed adjacent the electronics module housing 300 as shown, the exaggerated cantilever-like overhanging projection would cast a footprint-defining shadow on one or both of the facing surface of the electronics module housing 300 or on a portion of the inner surface 400I of windshield 400. It is this shadow—that when extended along the height-wise dimension—provides a structurally-enhanced volumetric space, while the dual-axis cantilevered construction of the main body portion 100B that enables such shadow formation also provides a rigid structural coupling for the mirror 200. As previously noted, vehicular safety regulations place strict limits on how equipment such as the electronics module housing 300 are permitted to encroach into Zone B or other locations on the windshield 400. The creation of the exaggerated cantilever-like overhanging projection (and concomitant additional volumetric space enabled thereby) without sacrificing structural rigidity helps to ensure that the structurally-reinforced volumetric bracket 100 is consistent with these vehicular safety regulations while providing a secure, efficiently-package for the placement of electronic components such as camera 320, lidar 330 or the like.

In one form, the facet 108, along with the remainder of the facets 103, 104, 105, 106, 107 and 109 that impart increased moment of inertia-related rigidity to the main body portion 100B of the structurally-reinforced volumetric bracket 100, forms a rigid, secure connection with the tab 110 to provide structural support. In one form, it is beneficial that this facet 108 does not define too large of a generally planar surface area, particularly when its surface area is large compared to the surface area defined by the tab 110, as otherwise a load imparted by the latter to the former may impart a point load that in turn could cause the facet 108 to a reduced resistance to deflection that in turn could make it—as well as the mirror

200 attached thereto—more prone to vibration-induced movement. In one form, the construction of the structurally-reinforced volumetric bracket 100 may be analogized to a cantilevered beam-like structure (in particular, the aforementioned dual-axis cantilever). As is understood, a cantilever is rigidly affixed to an (at least locally) immobile object at one end and left generally unrestrained at an opposing end. Within the present context, the structurally-reinforced volumetric bracket 100 generally resembles a cantilever in that its proximal end 100P that is defined by wings 101 and 102 of the windshield-engaging portion 100W is secured to the windshield 400 (such as through adhesives or the like) forms a fixed, locally immobile base while the end that is formed by the tab 110 along the height-wise dimension forms a relatively unconstrained free (and therefore moveable) distal end 100D that corresponds to the mirror-engaging portion 100M. Such avoidance of deflection made possible by the enhanced rigidity construction of the structurally-reinforced volumetric bracket 100 in general and the main body portion 100B in particular is beneficial when secured to the rearview mirror 200 at the free, cantilevered end as any deflections (such as those introduced through the windshield 400 and other connected structure within the vehicle 500 by engine noise, road vibrations or the like, as well as forced relocation of the mirror 200 by the driver) tend to become magnified in direct proportion to a power of the length of the cantilever. By way of further analogy (and assuming that the structurally-reinforced volumetric bracket 100 may be simplistically modeled as a flat Euler beam under a point load L for the purposes disclosed herein), the deflection D goes up linearly with the load L and to the third power of the height-wise dimension z an inversely proportion to the moment of inertia I as follows:

$$D \propto L\frac{z^3}{I}.$$

Thus, under ordinary circumstances, one would not look to increase the dimension of a mirror-holding device along its most deflection-prone dimension (that is to say, in an orthogonally inwardly-facing z-axis direction from the windshield in a vehicular environment) and expect to reduce (or at least preserve) vibration or other load-based movement and the related reflective or other visual or optical aberrations. Of course, it will be understood that the aforementioned merely shows the tendency in qualitative rather than quantitative terms; those skilled in the art will understand that boundary fixation (including constraint) points, the nature of the load (for example, distributed rather than at a point) or other factors will significantly impact the precise amount the loaded element will respond under a particular scenario that may differ significantly from a simplistic Euler beam. Nevertheless, the authors of the present disclosure have discovered that they can overcome the otherwise detrimental response tendencies due to an extended cantilever-like shape for the structurally-reinforced volumetric bracket 100 by providing the disclosed irregular polyhedron-shaped plurality of faceted surfaces that are arranged cooperatively with one another to form the main body portion 100B as a way to improve the moment of inertia I (and therefore resistance) of a particular facet (specifically facet 108) that provides a contact point for the mirror 200.

Surprisingly, the authors of the present disclosure have discovered that by the present configuration of the structurally-reinforced volumetric bracket 100, such aberrations are reduced, despite the otherwise pronounced effect that increases in cantilever length along the height-wise dimension have on mirror vibratory response. In particular, the moment of inertia I goes up in a non-linear proportion to how much material (in the form of thicknesses or angles of the various facets 103, 104, 105, 106, 107, 108 and 109) may be used to interfere with the tendency of an elongated member to deflect under load. Serendipitously, providing a three-dimensional interior volume that is exaggerated along its height-wise dimension allows the structurally-reinforced volumetric bracket 100 to project farther into the passenger compartment 600 while simultaneously maintaining a small windshield-engaging footprint. This in turn imparts to the structurally-reinforced volumetric bracket 100 an increase in total volumetric space, particularly that portion that occupies a shadow region that is underneath the overhang O of FIG. 6. By such construction and its attendant increases in stiffness made by the windshield-engaging portion 100W, main body portion 100B and mirror-engaging portion 100M, when secured to the windshield, the exaggerated dimension is such that the mirror-engaging portion 100M is in one form at least 25 millimeters away from the inner surface 400I of the windshield 400 along a dimension that extends along a direction that is orthogonal to the inner surface 400I of the windshield 400, while in another form at least 30 millimeters away, in another form at least 40 millimeters away, and yet another form at least 50 millimeters away and still another form at least 60 millimeters away as compared to conventional devices that may permit no more than 5, 10 or 20 millimeters away. The exaggerated distance along the height-wise dimension and the overhang O are made possible by the enhanced rigidity of the structurally-reinforced volumetric bracket 100. As noted elsewhere, this in turn allows the volumetric space (such as that contained within the cavity C) to function as a structural, protective covering for electronic components that are placed in or around the electronics module housing 300, all while not compromising on the kind of structural rigidity needed to avoid excessive vibratory or other load-induced movement of the mirror 200. With regard to the aforementioned relative surface areas defined by the facet 108 and the tab 110, the authors of the present disclosure have discovered that keeping such ratio below about 30:1 significantly improves deflection and vibratory resistance in the structurally-reinforced volumetric bracket 100.

Referring next to FIGS. 7 and 8, another form of increasing the deflection and vibratory resistance in the structurally-reinforced volumetric bracket 100 is shown. In particular, the structurally-reinforced volumetric bracket 100 is shown in isolation over two different views to highlight—with the exception of a few slightly rounded vertices and dihedral angles the latter of which in turn defines various dihedrons between them—its generally polytope construction. As previously noted, the convex non-uniform (that is to say, irregular) polyhedron with high-stiffness dihedral angles provides a more rigid (that is to say, lower compliance) construction for the structurally-reinforced volumetric bracket 100, as does the use of high-modulus materials. As can be seen with particularity in FIG. 7, yet additional stiffening may be provided by including a reinforcing rib 130 that is formed within the cavity C that defines the volumetric space that is contained underneath the overhang O. The orientation of the reinforcing rib 130 allows it to impart I-beam like improvements to flexure resistance through increases in the second moment of inertia of the main body portion 100B, particularly about the roll (that is to say, x) axis which—depending on (among other things)

the relative widths along the x-axis and y-axis—may be more prone to vibratory movement that the side-so-side vibratory movement along the yaw (that is to say, y) axis. In one form, the reinforcing rib 130 may be integrally formed (such as through the aforementioned die casting or related process) such that the volumetric space that corresponds to cavity C is broken up into two side-by-side sub-cavities. It will be appreciated that one, two or all three of the approaches corresponding to (i) the faceted irregular polyhedron shape, (ii) the choice of a high-modulus material and (iii) the inclusion of the reinforcing rib 130 may be used to provide the desired amount of enhanced rigidity for the structurally-reinforced volumetric bracket 100. Significantly, even in configurations where the reinforcing rib 130 is present, the two side-by-side sub-cavities of the cavity C, coupled with the overhang O and the overall higher rigidity of the main body portion 100B still permits the placement of electronic components within a location that provides them with shell-like protection while not increasing (or even decreasing) the footprint of the electronics module housing 300. In one form, the construction of the structurally-reinforced volumetric bracket 100 even permits stacking of one or more electronic components or ancillary structure along the height-wise dimension that would not be available in lower-profile arrangements where the height-wise dimension may only be less than 20 millimeters.

As can be seen from FIGS. 7 and 8 (as well as many of the other figures), the connectivity between the various parts that make up the structurally-reinforced volumetric bracket 100, including one or more of the windshield-engaging portion 100W, the plurality of faceted surfaces of the main body portion 100B and the mirror-engaging portion 100M may be arranged (such as through casting or other fabrication technique) to define a single, continuous unitary construction with one another. Moreover, attachment of the structurally-reinforced volumetric bracket 100 to the inner surface 400I of the windshield 400 is such that the height-wise dimension that is depicted by the z-axis in these two figures and elsewhere is orthogonal to a substantial plane that is formed by the inner surface 400I. In addition, it will be appreciated that there are configurations where the windshield-engaging portion 100W is mounted or otherwise secured to something other than directly on the inner surface 400I of the windshield 400. For example, in one form (not shown), it may be mounted directly or indirectly (the latter through an intermediary, for example) onto the base 310 of the electronics module housing 300 that in turn may be secured (such as adhesively) to the inner surface 400I of the windshield 400. Other components that may be secured to the inner surface 400I may likewise be included. As such, the term "windshield-engaging portion 100W" is understood to having varying degrees of exactitude between it and the actual inner surface 400I, and that such precision will be apparent from the context.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and its variant "comprising", when used in this specification, specify the presence of stated features, integers, steps, operations, elements, or components, but do not preclude the presence or addition of one or more other features, integers, steps, operations, elements, components or groups thereof.

Within the present disclosure, the use of the prepositional phrase "at least one of" is deemed to be an open-ended expression that has both conjunctive and disjunctive attributes. For example, a claim that states "at least one of A, B and C" (where A, B and C are definite or indefinite articles that are the referents of the prepositional phrase) means A alone, B alone, C alone, A and B together, A and C together, B and C together or A, B and C together.

Within the present disclosure, the following claims are not written in means-plus-function format and are not intended to be interpreted based on 35 USC 112(f) unless and until such claim limitations expressly use the phrase "means for" followed by a statement of function void of further structure. To the extent that any means or step plus function elements may now or in the future be included in the claims, any such corresponding structures, materials, acts and equivalents of all means or step plus function elements are intended to include any structure, material or act for performing the function in combination with other claimed elements as specifically claimed.

The description of the present disclosure has been presented for purposes of illustration only and as such not intended to be exhaustive or limited. Many modifications and variations will be apparent to those of ordinary skill in the art without departing from the scope and spirit of the present disclosure. Aspects of the disclosure were chosen and described in order to best explain the principles of the disclosed subject matter and the practical application, and to enable others of ordinary skill in the art to understand the same for various embodiments with various modifications as are suited to the particular use contemplated.

What is claimed is:

1. A structurally-reinforced volumetric bracket for a vehicular rearview mirror, the structurally-reinforced volumetric bracket comprising:

a main body portion that defines a height-wise dimension that extends from a distal end to a proximal end, the main body portion possessing an increased moment of inertia-related rigidity through an irregular polyhedron-shaped plurality of faceted surfaces arranged cooperatively with one another;

a windshield-engaging portion situated at the proximal end of the main body portion; and a mirror-engaging portion situated at the distal end of the main body portion, wherein the main body portion forms connectivity between the windshield-engaging portion and the mirror-engaging portion through at least one of the polyhedron-shaped plurality of faceted surfaces such that—upon attachment of the structurally-reinforced volumetric bracket to an inner surface of a windshield or another component secured thereto—a linear distance from the mirror-engaging portion to the windshield-engaging portion along the height-wise dimension is orthogonal to a substantial plane that is formed by a windshield-engaging surface of the windshield-engaging portion to define an exaggerated cantilever-like overhang that projects a corresponding footprint onto an inner surface of a windshield to provide, along the height-wise dimension, an enhancement to a volumetric space within a cavity that is formed between the irregular polyhedron-shaped plurality of faceted surfaces and the footprint.

2. The structurally-reinforced volumetric bracket of claim 1, wherein the connectivity formed between the main body portion, the windshield-engaging portion and the mirror-engaging portion defines a unitary construction.

3. The structurally-reinforced volumetric bracket of claim 2, wherein the structurally-reinforced volumetric bracket is configured to be secure directly to an inner surface of a windshield.

4. The structurally-reinforced volumetric bracket of claim 3, wherein when secured to a windshield, the exaggerated cantilever-like overhang is such that the mirror-engaging portion is at least 25 millimeters away from an inner surface of a windshield along the height-wise dimension.

5. The structurally-reinforced volumetric bracket of claim 4, wherein when secured to a windshield, the mirror-engaging portion is at least 30 millimeters away from an inner surface thereof along the height-wise dimension.

6. The structurally-reinforced volumetric bracket of claim 5, wherein when secured to a windshield, the mirror-engaging portion is at least 40 millimeters away from an inner surface thereof along the height-wise dimension.

7. The structurally-reinforced volumetric bracket of claim 6, wherein when secured to a windshield, the mirror-engaging portion is at least 50 millimeters away from an inner surface thereof along the height-wise dimension.

8. The structurally-reinforced volumetric bracket of claim 7, wherein when secured to the windshield, the mirror-engaging portion is at least 60 millimeters away from an inner surface thereof along the height-wise dimension.

9. The structurally-reinforced volumetric bracket of claim 1, further comprising a reinforcing rib that is disposed within a volume that is formed by the rigid structural housing.

10. The structurally-reinforced volumetric bracket of claim 1, wherein the structurally-reinforced volumetric bracket is made from an aluminum alloy, a zinc alloy and combinations thereof.

11. The structurally-reinforced volumetric bracket of claim 1, wherein the structurally-reinforced volumetric bracket is made from a high-performance plastic.

12. The structurally-reinforced volumetric bracket of claim 1, wherein a surface area ratio of one of the plurality of faceted surfaces that supports the mirror-engaging portion to a mirror-engaging tab is no greater than 30:1.

13. The structurally-reinforced volumetric bracket of claim 1, wherein the mirror-engaging portion defines a tab that pivots about a rotational axis.

14. A rearview mirror assembly for a vehicular windshield, the rearview mirror assembly comprising:

a mirror;

a support connected to the mirror to provide pivoting movement thereto; and a structurally-reinforced volumetric bracket comprising:

a main body portion that defines a height-wise dimension that extends from a distal end to a proximal end, the main body portion possessing an increased moment of inertia-related rigidity through an irregular polyhedron-shaped plurality of faceted surfaces arranged cooperatively with one another;

a windshield-engaging portion situated at the proximal end of the main body portion; and a mirror-engaging portion situated at the distal end of the main body portion with which to connect to at least one of the support and the mirror, wherein the main body portion forms connectivity between the windshield-engaging portion and the mirror-engaging portion through at least one of the polyhedron-shaped plurality of faceted surfaces such that—upon attachment of the structurally-reinforced volumetric bracket to an inner surface of a windshield or another component secured thereto—a linear distance from the mirror-engaging portion to the windshield-engaging portion along the height-wise dimension is orthogonal to a substantial plane that is formed by a windshield-engaging surface of the windshield-engaging portion to define an exaggerated cantilever-like overhang that projects a corresponding footprint onto an inner surface of a windshield to provide, along the height-wise dimension, an enhancement to a volumetric space within a cavity that is formed between the irregular polyhedron-shaped plurality of faceted surfaces and the footprint.

15. An electronics assembly for a vehicular windshield, the electronics assembly comprising:

a plurality of electronic components;

an electronics module housing defining a plurality of sites formed therein for the placement of the plurality of electronic components, the electronics module housing comprising a base and a cover secured to one another wherein at least a portion of the base defines a windshield-engaging adhesive surface such that when the electronics module housing is secured to an inner surface of a windshield, it provides a generally forward field of view therethrough for at least one of the plurality of electronic components; and a structurally-reinforced volumetric bracket for a rearview mirror, the structurally-reinforced volumetric bracket cooperative with electronics module housing such that when the structurally-reinforced volumetric bracket is secured to an inner surface of a windshield, the structurally-reinforced volumetric bracket provides a cantilevered overhang relative to at least a portion of the electronics module housing to define a volumetric space with a cavity therein, the structurally-reinforced volumetric bracket comprising:

a main body portion that defines a height-wise dimension that extends from a distal end to a proximal end, the main body portion possessing an increased moment of inertia-related rigidity through an irregular polyhedron-shaped plurality of faceted surfaces arranged cooperatively with one another;

a windshield-engaging portion situated at the proximal end of the main body portion; and a mirror-engaging portion situated at the distal end of the main body portion, wherein the main body portion forms connectivity between the windshield-engaging portion and the mirror-engaging portion through at least one of the polyhedron-shaped plurality of faceted surfaces such that—upon attachment of the structurally-reinforced volumetric bracket to an inner surface of a windshield—a linear distance from the mirror-engaging portion to the windshield-engaging portion along the height-wise dimension is orthogonal to a substantial plane that is formed by a windshield-engaging surface of the windshield-engaging portion to define an exaggerated cantilever-like overhang that projects onto a windshield-engaging footprint of the electronics module housing to provide, along the height-wise dimension, an enhancement to the volumetric space within the cavity that is formed between the irregular polyhedron-shaped plurality of faceted surfaces and the windshield-engaging footprint.

16. The electronics assembly of claim 15, wherein the electronic components comprise at least one of camera, a lidar unit, a rain sensor, a radar unit, a temperature sensor, other sensors, a telephone communications module and a display.

17. The electronics assembly of claim 15, wherein the structurally-reinforced volumetric bracket is configured to be secured directly to an inner surface of a windshield.

18. The electronics assembly of claim 15, wherein the structurally-reinforced volumetric bracket is secured directly to the electronics module housing.

19. A method of making a vehicular rearview mirror assembly, the method comprising:

forming a structurally-reinforced volumetric bracket to comprise a main body portion, a windshield-engaging portion and a mirror-engaging portion, wherein the main body portion possesses an increased moment of inertia-related rigidity through an irregular polyhedron-shaped plurality of faceted surfaces arranged cooperatively with one another to form a rigid structural housing;

securing the structurally-reinforced volumetric bracket to a mirror through a support connected therebetween, the cooperation of the structurally-reinforced volumetric bracket, support and mirror being such that the mirror may have provide pivoting movement thereto; and placing the structurally-reinforced volumetric bracket, support and mirror into cooperation with an electronics module housing that when secured to an inner surface of a vehicular windshield provides a generally forward field of view therethrough for at least one of a plurality of electronic components that are configured to be contained within the electronics module housing, wherein the structurally-reinforced volumetric bracket defines a height-wise dimension that extends from a distal end to a proximal end such that the main body portion forms connectivity between the windshield-engaging portion and the mirror-engaging portion through at least one of the polyhedron-shaped plurality of faceted surfaces to define a linear distance from the mirror-engaging portion to the windshield-engaging portion along the height-wise dimension that is orthogonal to a substantial plane that is formed by a windshield-engaging surface of the windshield-engaging portion to define an exaggerated cantilever-like overhang that projects a corresponding footprint onto an inner surface of a windshield to provide, along the height-wise dimension, an enhancement to a volumetric space within a cavity that is formed between the irregular polyhedron-shaped plurality of faceted surfaces and the footprint.

20. The method of claim 19, wherein the structurally-reinforced volumetric bracket is made from a material comprising at least one of an aluminum alloy, a zinc alloy and a high-performance plastic.

21. The method of claim 20, wherein the structurally-reinforced volumetric bracket is made by casting.

* * * * *